US012615589B2

(12) United States Patent
Desai et al.

(10) Patent No.: US 12,615,589 B2
(45) Date of Patent: Apr. 28, 2026

(54) APPARATUS, SYSTEM AND METHOD OF CONTROLLING BLUETOOTH ACTIVITIES OF A BLUETOOTH DEVICE

(71) Applicant: INTEL CORPORATION, Santa Clara, CA (US)

(72) Inventors: Prasanna Desai, Elfin Forest, CA (US); David Birnbaum, Modiin (IL); Arnaud Pierres, Cupertino, CA (US); Atsuo Kuwahara, Portland, OR (US); Noam Ginsburg, Haifa (IL); Jacques Behar, Zichron Yaacov (IL); Michael Shusterman, Portland, OR (US); Yashodhara Devadiga, San Diego, CA (US); Izoslav Tchigevsky, Haifa (IL); Avihay Cohen, Karkur (IL); Guy Halperin, Tel Aviv (IL)

(73) Assignee: INTEL CORPORATION, Santa Clara, CA (US)

( * ) Notice: Subject to any disclaimer, the term of this patent is extended or adjusted under 35 U.S.C. 154(b) by 1029 days.

(21) Appl. No.: 17/132,088

(22) Filed: Dec. 23, 2020

(65) Prior Publication Data

US 2021/0168710 A1 Jun. 3, 2021

(51) Int. Cl.
*H04W 52/02* (2009.01)
*H04W 4/80* (2018.01)
*H04W 72/0446* (2023.01)

(52) U.S. Cl.
CPC ......... *H04W 52/0209* (2013.01); *H04W 4/80* (2018.02); *H04W 72/0446* (2013.01)

(58) Field of Classification Search
CPC ........................... H04W 52/0209; H04W 4/80; H04W 72/0446
See application file for complete search history.

(56) References Cited

U.S. PATENT DOCUMENTS

| | | | |
|---|---|---|---|
| 10,218,433 B2 * | 2/2019 | Panther | A61B 5/02416 |
| 10,243,871 B1 * | 3/2019 | Patel | H04L 43/16 |
| 11,395,225 B1 * | 7/2022 | Wong | H04W 76/28 |
| 2010/0020729 A1 * | 1/2010 | Walley | H04M 1/6066 370/277 |
| 2013/0324181 A1 * | 12/2013 | Aio | H04W 52/04 455/522 |
| 2014/0153444 A1 * | 6/2014 | Zhou | H04W 40/005 370/256 |
| 2017/0171807 A1 * | 6/2017 | Noh | H04L 43/08 |

(Continued)

FOREIGN PATENT DOCUMENTS

WO WO-2017142672 A1 * 8/2017 ............ H04W 28/02

OTHER PUBLICATIONS

Bluetooth Core Specification V 5.0, Dec. 6, 2016, 2822 pages.

*Primary Examiner* — Michael Thier
*Assistant Examiner* — Nevena Zecevic Sandhu
(74) *Attorney, Agent, or Firm* — Shichrur & Co.

(57) ABSTRACT

In some aspects, a Bluetooth (BT) device may include a BT controller configured to receive a power state indication from a host processor of the BT device, the power state indication to indicate a power state corresponding to a power source being utilized by the BT device; and to control one or more BT activities of the BT device according to a BT communication scheme, the BT controller to configure the BT communication scheme based on the power state indication.

24 Claims, 3 Drawing Sheets

(56) References Cited

U.S. PATENT DOCUMENTS

| | | | |
|---|---|---|---|
| 2018/0199214 A1* | 7/2018 | Shen | H04W 4/80 |
| 2019/0166581 A1* | 5/2019 | Lien | H04W 72/02 |
| 2020/0128069 A1* | 4/2020 | Chen | H04W 84/18 |
| 2021/0123982 A1* | 4/2021 | Pantazis | G01R 31/3646 |
| 2021/0315031 A1* | 10/2021 | Wu | H04W 84/18 |
| 2022/0148608 A1* | 5/2022 | Wang | H04W 4/80 |
| 2024/0040343 A1* | 2/2024 | Lin | G04G 9/0064 |

* cited by examiner

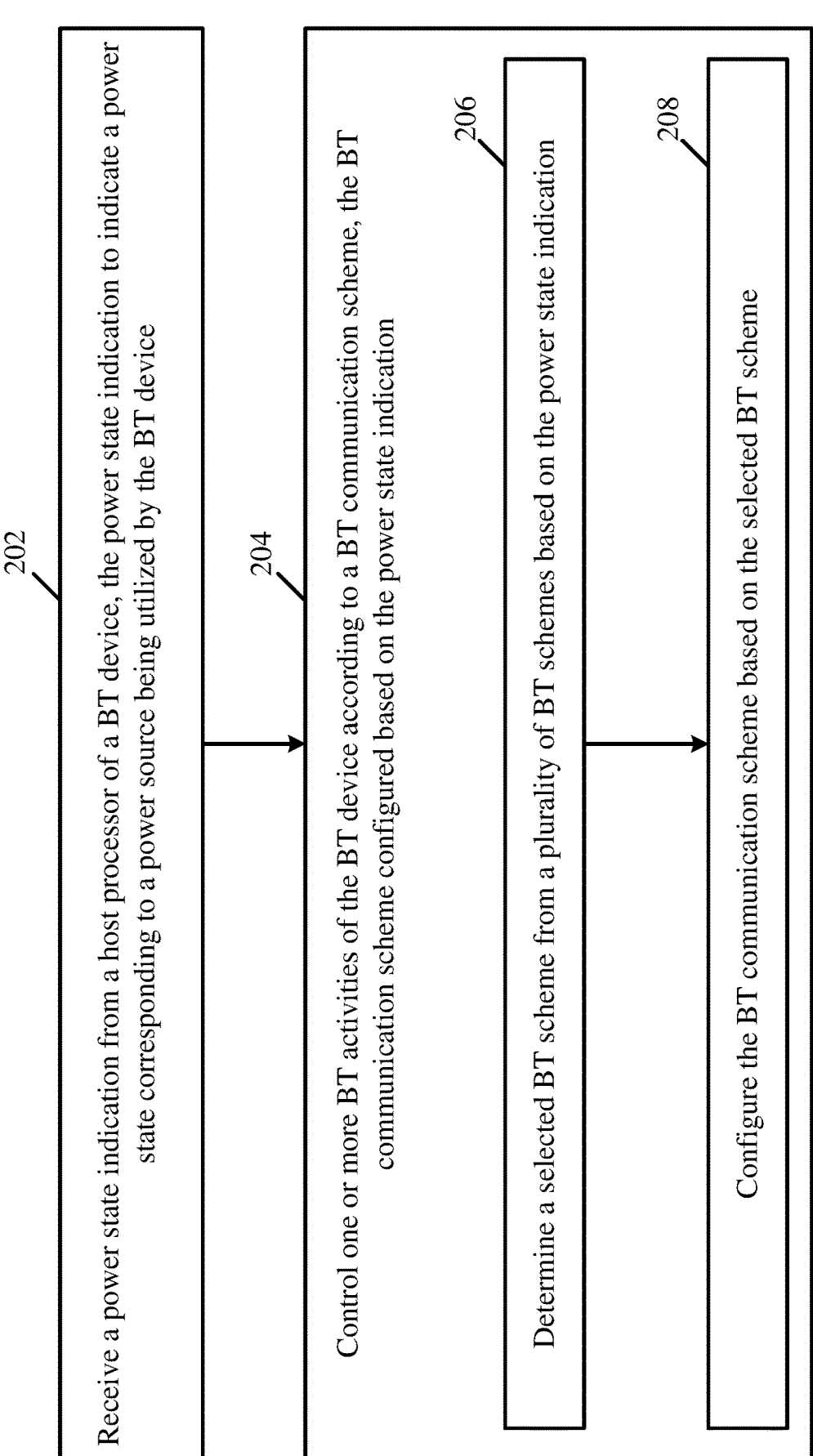

202

Receive a power state indication from a host processor of a BT device, the power state indication to indicate a power state corresponding to a power source being utilized by the BT device

204

Control one or more BT activities of the BT device according to a BT communication scheme, the BT communication scheme configured based on the power state indication

206

Determine a selected BT scheme from a plurality of BT schemes based on the power state indication

208

Configure the BT communication scheme based on the selected BT scheme

Fig. 2

APPARATUS, SYSTEM AND METHOD OF CONTROLLING BLUETOOTH ACTIVITIES OF A BLUETOOTH DEVICE

TECHNICAL FIELD

Aspects described herein generally relate to controlling Bluetooth activities of a Bluetooth device.

BACKGROUND

A first Bluetooth device may be connected to and/or paired with a second Bluetooth device, for example, to transfer data between the first and second Bluetooth devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 2 is a schematic flow-chart illustration of a method of controlling Bluetooth (BT) activities of a BT device, in accordance with some demonstrative aspects.

DETAILED DESCRIPTION

Figure 1:
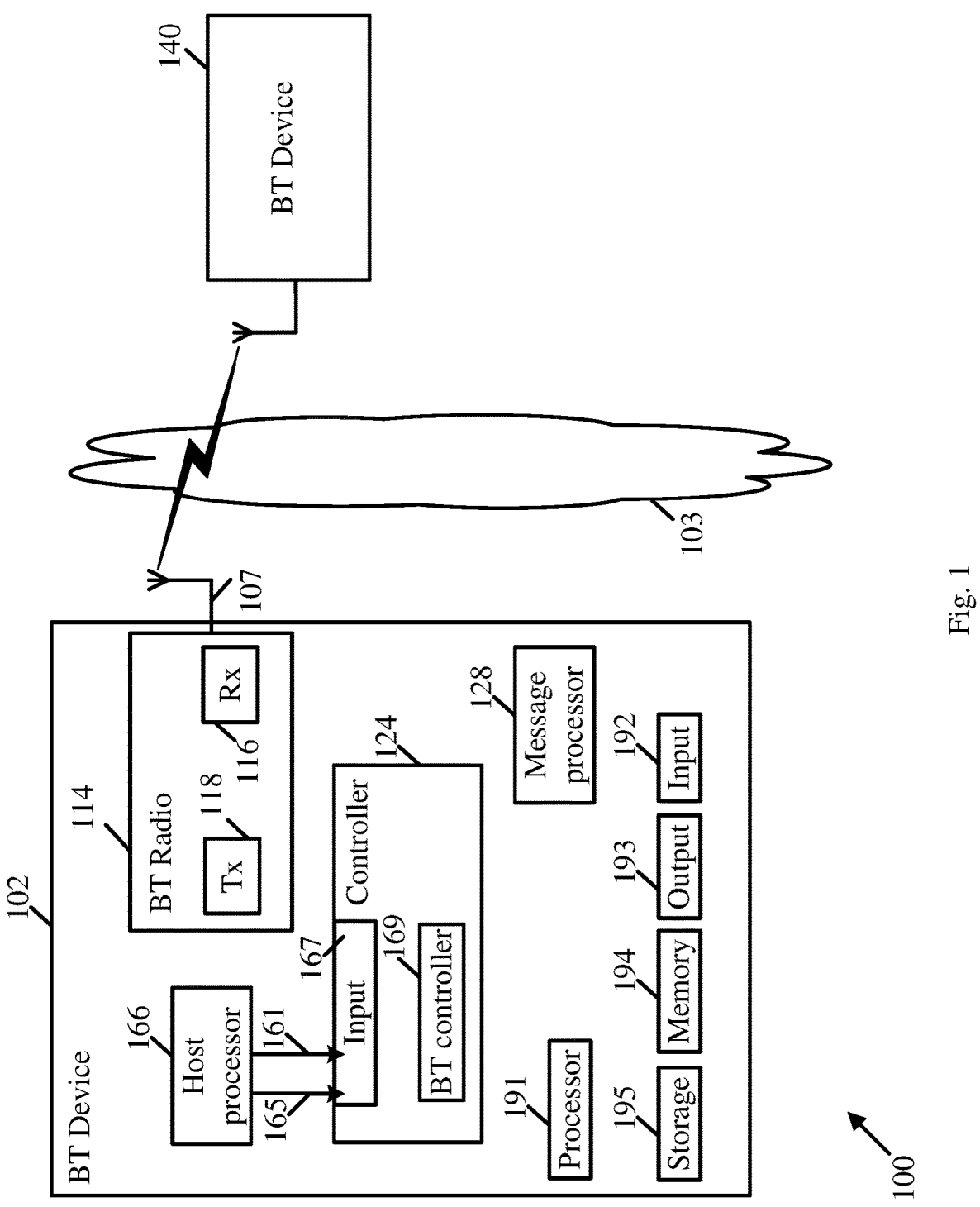
FIG. 1 is a schematic block diagram illustration of a system, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some aspects may be used in conjunction with various devices and systems, for example, a User Equipment (UE), a Bluetooth (BT) device, a Bluetooth Low Energy (BLE) device, an audio device, a video device, an audio (A/V) device, a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some aspects may be used in conjunction with devices and/or networks operating in accordance with existing Bluetooth standards ("the Bluetooth standards"), e.g., including Bluetooth Core Specification V 5.0, Dec. 6, 2016, and/or future versions and/or derivatives thereof, devices and/or networks operating in accordance with existing IEEE 802.11 standards (including IEEE 802.11-2016 (IEEE 802.11-2016, IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016)) and/or future versions and/or derivatives thereof, devices and/or networks operating in accordance with existing WFA Peer-to-Peer (P2P) specifications (WiFi P2P technical specification, version 1.7, Jul. 6, 2016) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some aspects may be used in conjunction with one way and/or two-way radio communication systems, a Bluetooth system, a BLE system, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some aspects may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), Extended GPRS, Code-Division Multiple Access (CDMA), Wideband CDMA (WCDMA), CDMA 2000, single-carrier CDMA, multi-carrier CDMA, Multi-Carrier Modulation (MCM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE Advanced, Enhanced Data rates for GSM Evolution (EDGE), or the like. Other aspects may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that is integrated with a computer, or a peripheral that is attached to a computer. In some demonstrative aspects, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN and the like.

Some demonstrative aspects may be used in conjunction with a wireless communication network communicating over a frequency band of 2.4 GHz, 5 GHz, or 6 GHz. However, other aspects may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

Some demonstrative aspects are described herein with respect to BT communication, e.g., according to a BT protocol and/or a BLE protocol. However, other aspects may be implemented with respect to any other communication scheme, network, standard and/or protocol.

Reference is now made to FIG. 1, which schematically illustrates a block diagram of a system 100, in accordance with some demonstrative aspects.

As shown in FIG. 1, in some demonstrative aspects system 100 may include a wireless communication network including one or more wireless communication devices, e.g., including wireless communication devices 102 and/or 140.

In some demonstrative embodiments, wireless communication devices 102 and/or 140 may include, for example, a computing device, UE, an MD, a STA, a PC, a desktop computer, a mobile computer, a laptop computer, an Ultrabook™ computer, a Smartphone, a gaming device, a peripheral device, a notebook computer, a tablet computer, a server computer, a handheld computer, an Internet of Things (IoT) device, a sensor device, a handheld device, a wearable device, an on-board device, an off-board device, a consumer device, a vehicular device, a non-vehicular device, a mobile or portable device, a non-mobile or non-portable device, a mobile phone, a cellular telephone, a video device, an audio device, an A/V device, a video source, an audio source, a video sink, an audio sink, a Personal Media Player (PMP), a digital audio player, a gaming device, a data source, a data sink, a media player, or the like.

In some demonstrative aspects, devices 102 and/or 140 may include, operate as, and/or perform the functionality of one or more BT devices.

In some demonstrative aspects, device 102 may include a BT mobile device, and/or device 140 may include a BT mobile device. In other aspects, device 102 and/or device 140 may include a non-mobile BT device.

In one example, devices 102 and/or 140 may include BT Low Energy (LE) (BLE) compatible devices. In other aspects, devices 102 and/or 140 may include or implement any other additional or alternative BT communication functionality, e.g., according to any other additional or alternative BT protocol.

In some demonstrative aspects, devices 102 and/or 140 may include, operate as, and/or perform the functionality of one or more STAs. For example, device 102 may include at least one STA, and/or device 140 may include at least one STA.

In some demonstrative aspects, devices 102 and/or 140 may include, operate as, and/or perform the functionality of one or more WLAN STAs.

In some demonstrative aspects, devices 102 and/or 140 may include, operate as, and/or perform the functionality of one or more Wi-Fi STAs.

In one example, a station (STA) may include a logical entity that is a singly addressable instance of a medium access control (MAC) and physical layer (PHY) interface to the wireless medium (WM). The STA may perform any other additional or alternative functionality.

In other aspects, devices 102 and/or 140 may include, operate as, and/or perform the functionality of any other type of STA and/or device.

In some demonstrative aspects, device 102 may include, for example, one or more of a processor 191, an input unit 192, an output unit 193, a memory unit 194, and/or a storage unit 195. Device 102 may optionally include other suitable hardware components and/or software components. In some demonstrative aspects, some or all of the components of device 102 may be enclosed in a common housing or packaging, and may be interconnected or operably associated using one or more wired or wireless links. In other aspects, components of device 102 may be distributed among multiple or separate devices.

In some demonstrative aspects, processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications.

In some demonstrative aspects, input unit 192 may include, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative aspects, memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102.

In some demonstrative aspects, wireless communication devices 102 and/or 140 may be capable of communicating content, data, information and/or signals via a wireless medium (WM) 103.

In some demonstrative aspects, wireless medium 103 may include, for example, a BT channel, a radio channel, a cellular channel, a Global Navigation Satellite System (GNSS) Channel, an RF channel, a WiFi channel, an IR channel, and the like.

In some demonstrative aspects, wireless communication medium 103 may include a 2.4 GHz frequency band, and/or one or more other wireless communication frequency bands, for example, a 5 GHz frequency band, a 6 GHz frequency band, a millimeterWave (mmWave) frequency band, e.g., a 60 GHz frequency band, a Sub-1 GHz (S1G) band, and/or any other frequency band.

In some demonstrative aspects, devices 102 and/or 140 may include one or more BT radios including circuitry and/or logic to perform wireless communication between devices 102, 140 and/or one or more other BT devices. For example, device 102 may include at least one BT radio 114.

In some demonstrative aspects, devices 102 and/or 140 may include one or more other radios, e.g., a WiFi radio, an OFDM radio, a cellular radio, and/or the like.

In some demonstrative aspects, BT radio 114 may include one or more wireless receivers (Rx) including circuitry and/or logic to receive wireless communication signals, RF signals, frames, blocks, transmission streams, packets, messages, data items, and/or data. For example, radio 114 may include at least one receiver 116.

In some demonstrative aspects, BT radio 114 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118.

In some demonstrative aspects, BT radio 114, transmitter 118, and/or receiver 116 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like.

In some demonstrative aspects, BT radio 114 may be configured to communicate over a 2.4 GHz band, and/or any other band.

In some demonstrative aspects, BT radio 114 may include, or may be associated with, one or more antennas. For example, BT radio 114 may include, or may be associated with, one or more antennas 107.

In one example, device 102 may include a single antenna 107. In another example, device 102 may include two or more antennas 107.

For example, antennas 107 may include any type of antennas suitable for transmitting and/or receiving wireless communication signals, blocks, frames, transmission streams, packets, messages and/or data. For example, antennas 107 may include any suitable configuration, structure and/or arrangement of one or more antenna elements, components, units, assemblies and/or arrays. In some aspects, antennas 107 may implement transmit and receive functionalities using separate transmit and receive antenna elements. In some aspects, antennas 107 may implement transmit and receive functionalities using common and/or integrated transmit/receive elements.

In some demonstrative aspects, device 102 may include a controller 124 configured to perform and/or to trigger, cause, instruct and/or control device 102 to perform, one or more communications, to generate and/or communicate one or more messages and/or transmissions, and/or to perform one or more functionalities, operations and/or procedures between devices 102, 140, and/or one or more other devices, e.g., as described below.

In some demonstrative aspects, controller 124 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controller 124. Additionally or alternatively, one or more functionalities of controller 124 may be implemented by logic, which may be executed by a machine and/or one or more processors, e.g., as described below.

In one example, controller 124 may include circuitry and/or logic, for example, one or more processors including circuitry and/or logic, to cause, trigger and/or control a BT audio device, e.g., device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative aspects, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a communication medium, e.g., over a wireless communication channel in a wireless communication frequency band, for example, by applying to one or more fields of the PPDU one or more transmit waveforms. In other aspects, message processor 128 may be configured to perform any other additional or alternative functionality and/or may include any other additional or alternative components to generate and/or process a message to be transmitted.

In some demonstrative aspects, message processor 128 may include circuitry and/or logic, e.g., processor circuitry and/or logic, memory circuitry and/or logic, MAC circuitry and/or logic, PHY circuitry and/or logic, and/or any other circuitry and/or logic, configured to perform the functionality of message processor 128. Additionally or alternatively, one or more functionalities of message processor 128 may be implemented by logic, which may be executed by a machine and/or one or more processors, e.g., as described below.

In some demonstrative aspects, at least part of the functionality of message processor 128 may be implemented as part of controller 124. In other aspects, the functionality of message processor 128 may be implemented as part of any other element of device 102.

In some demonstrative aspects, at least part of the functionality of controller 124 and/or message processor 128 may be implemented by an integrated circuit, for example, a chip, e.g., a System on Chip (SoC). In one example, the chip or SoC may be configured to perform one or more functionalities of BT radio 114. For example, the chip or SoC may include one or more elements of controller 124, one or more elements of message processor 128, and/or one or more elements of BT radio 114. In one example, controller 124, message processor 128, and BT radio 114 may be implemented as part of the chip or SoC.

In other aspects, controller 124, message processor 128 and/or BT radio 114 may be implemented by one or more additional or alternative elements of device 102.

In some demonstrative aspects, in some use cases, scenarios, and/or implementations, there may be a need to provide a technical solution to support improved performance and/or efficient utilization of one or more BT activities of a wireless communication device.

For example, some wireless activities, for example, wireless scanning activities and/or other activities, may constantly occur in the background, e.g., regardless of user activity by a user of the computing device.

For example, in some cases, and/or implementations, strict restrictions may be placed on the behavior of wireless devices, for example, in attempt to a achieve a right balance of performance, e.g., in terms of latency and/or responsiveness, versus power consumption, e.g., in terms of RF performance, scanning duty cycles, amount of interference measurements scheduled for detect-and-avoid schemes, and the like.

In some demonstrative aspects, a computing device, e.g., device 102, may implement one or more techniques, which may allow to not have to always accept a compromise solution that balances between power consumption and high performance, e.g., as described below.

In some demonstrative aspects, controller 124 may configure one or more performance and/or power consumption requirements of device 102, for example, based on a platform state of device 102 and/or a user RF environment of device 102, e.g., as described below.

In some demonstrative aspects, controller 124 may be configured to control one or more BT activities of device 102, for example, according to the one or more performance and/or power consumption requirements, which may be configured based on the platform state of device 102 and/or the user RF environment of device 102, e.g., as described.

In some demonstrative aspects, controller 124 may be configured to control one or more BT activities of device 102, for example, according to the platform state and/or RF environment of device 102, for example, even without compromising on a tradeoff between performance and power consumption e.g., as described below.

In some demonstrative aspects, device 102 may include a host processor 166, which may be configured to indicate to controller 124 a power state of device 102, e.g., as described below.

In some demonstrative aspects, controller 124 may be configured to control one or more BT activities of device 102, for example, based on the indicated power state of device 102, e.g., as described below.

In some demonstrative aspects, host processor 166 may be configured to control and/or manage one or more operations and/or functionalities of device 102.

In some demonstrative aspects, host processor 166 may include, and/or may be configured to perform one or more operations and/or functionalities of, a central processor and/or a main processor of device 102.

In one example, host processor 166 may include, and/or may be configured to perform one or more operations and/or functionalities of, a BT host processor. In another example, host processor 166 may be configured to execute instructions of an OS of device 102. In another example, host processor 166 may be configured to control one or more power states and/or modes of operation of device 102. In other aspects, host processor 166 may be configured to perform one or more additional or alternative operations and/or functionalities.

In some demonstrative aspects, processor 191 may be configured to perform one or more operations and/or functionalities of host processor 166. In other aspects, processor 166 and processor 191 may be implemented as separate elements of device 102.

In some demonstrative aspects, host processor 166 may be configured to generate a power state indication 165 to indicate a power state of device 102 to one or more wireless communication elements of device 102, e.g., to controller 124, as described below.

In some demonstrative aspects, host processor 166 may be configured to provide the power state indication 165 to controller 124, for example, via a Host Controller Interface (HCI), and/or any other interface.

In some demonstrative aspects, host processor 166 may be configured to provide the power state indication 165 to indicate whether device 102 is at a wall-power state or at a battery power state, e.g., as described below.

In some demonstrative aspects, host processor 166 may be configured to provide the power state indication 165 to indicate a power state of a battery of device, 102, e.g., as described below.

In some demonstrative aspects, host processor 166 may be configured to provide the power state indication 165 to indicate whether a battery capacity of the battery of device 102 is in excess of a predefined capacity threshold, e.g., 80% or any other threshold.

In other aspects, host processor 166 may be configured to provide the power state indication 165 to indicate any other additional or alternative power state of device 102.

In some demonstrative aspects, controller 124 may be configured to control one or more BT activities of device 102, for example, based at least on the power state indication 165, e.g., as described below.

In some demonstrative aspects, controller 124 may be configured to control one or more BT activities of device 102, based at least on the power state indication 165, for example, by selectively activating and/or triggering one or more BT activities, by selectively stopping and/or halting one or more BT activities, and/or by controlling a configuration and/or setup of one or more BT activities, e.g., as described below.

In some demonstrative aspects, controller 124 may be configured to selectively allow device 102 to perform one or more BT activities to achieve a higher performance mode, for example, based at least on the power state indication 165, e.g., as described below.

In some demonstrative aspects, controller 124 may be configured to select between a compromised mode of operation and a non-compromised mode of operation, for example, based at least on the power state indication 165, e.g., as described below.

In some demonstrative aspects, when at the compromised mode of operation, controller 124 may configure one or more BT activities of device based on a tradeoff, or compromise, between power consumption and performance.

In some demonstrative aspects, controller 124 may be configured to selectively operate one or more BT activities of device 102 according to the non-compromised mode of operation, for example, when the power state indication 165 indicates that the power state of device 102 can support a required power consumption according to the non-compromised mode of operation, e.g., as described below.

In some demonstrative aspects, when at the compromised mode of operation, controller 124 may configure one or more BT activities of device 102, for example, to achieve a high, or even maximal, performance, for example, with reduced restriction, or even without any restriction, on a power consumption of device 102, e.g., as described below.

In one example, controller 124 may be configured to selectively configure one or more BT activities of device 102, for example, to achieve a high, or even maximal, performance, for example, based on a determination that power state indication 165 indicates that device 102 is connected to a wall power and/or that the capacity of the battery of device 102 is above a predefined threshold, e.g., 80% or any other battery capacity threshold, e.g., as described below.

In some demonstrative aspects, controller 124 may include an input 167, which may be configured to receive power state indication 165 from a host processor 166.

In some demonstrative aspects, power state indication 165 may be configured to indicate a power state corresponding to a power source being utilized by BT device 102, e.g., as described below.

In some demonstrative aspects, power state indication 165 may be provided as an HCI message from host processor 166. For example, input 167 may include, or may be part of, an HCI component to interface between controller 124 and host processor 166. In other aspects, power state indication 165 may be provided in any other form, as part of any other message, and/or via any other interface.

In some demonstrative aspects, controller 124 may include, operate as, perform a role of, and/or perform one or more functionalities of, a BT controller 169, which may be configured to control one or more BT operations and/or communications of device 102, e.g., as described below.

In some demonstrative aspects, BT controller 169 may include, or may be implemented, partially or entirely, by circuitry and/or logic, e.g., one or more processors including circuitry and/or logic, memory circuitry and/or logic, MAC circuitry and/or logic, and/or any other circuitry and/or logic, configured to perform the functionality of BT controller 169. Additionally or alternatively, one or more functionalities of BT controller 169 may be implemented by logic, which may be executed by a machine and/or one or more processors, e.g., as described below.

In one example, BT controller 169 may include circuitry and/or logic, for example, one or more processors including circuitry and/or logic, to cause, trigger and/or control a BT device, e.g., device 102, and/or a BT radio, e.g., BT radio 114, to perform one or more operations, communications and/or functionalities, e.g., as described herein. In one example, BT controller 169 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative aspects, BT controller 169 may be configured to control one or more BT activities of BT device 102 according to a BT communication scheme, e.g., as described below.

In some demonstrative aspects, BT controller 169 may be configured to control the BT radio 114 to communicate one or more BT transmissions according to the BT communication scheme, e.g., as described below.

In some demonstrative aspects, BT controller 169 may be configured to control a BT scan to be performed by the BT radio 114 according to the BT communication scheme, e.g., as described below.

In some demonstrative aspects, BT controller 169 may be configured to configure the BT communication scheme, for example, based at least on the power state indication 165, e.g., as described below.

In some demonstrative aspects, the power state indication 165 may be configured to identify whether the power source being utilized by the BT device 102 includes a battery of the BT device 102 or a wall outlet, e.g., as described below.

In some demonstrative aspects, BT controller 169 may be configured to process the power state indication 165 to determine whether the BT device 102 is currently using a battery of the BT device 102 as a power source, or if the BT device 102 is currently using a wall outlet (mains power) as a power source.

In some demonstrative aspects, the power state indication 165 may include an indication of a charge level of the battery of the BT device 102.

In some demonstrative aspects, BT controller 169 may be configured to process the power state indication 165 to determine an actual charge level of the battery of the BT device 102, e.g., to determine whether the battery of BT device 102 is fully charged, and/or to determine a partial charging level of the battery, e.g., 20%, 50%, 80%, or the like.

In some demonstrative aspects, BT controller 169 may be configured to process the power state indication 165 to determine whether the actual charge level of the battery of the BT device 102 is a below a charge threshold, e.g., to determine whether the charge level of the battery of BT device 102 is above or below 80%, above or below 60%, or the like.

In other aspects, the power state indication 165 may include any other additional or alternative indication with respect to the power state of device 102.

In some demonstrative aspects, the BT controller 169 may be configured to determine a selected BT scheme from a plurality of BT schemes, for example, based on the power state indication 165, e.g., as described below.

In some demonstrative aspects, the BT controller 169 may configure the BT communication scheme, for example, based on the selected BT scheme, e.g., as described below In some demonstrative aspects, BT controller 169 may configure the BT communication scheme according to a first BT scheme, for example, based on a determination that the power state indication 165 indicates a first power state, e.g., as described below.

In some demonstrative aspects, the first power state may support a first power consumption of the BT device 102, e.g., as described below.

In some demonstrative aspects, the first BT scheme may be configured to support a first BT performance according to a BT performance parameter, e.g., as described below.

In some demonstrative aspects, BT controller 169 may configure the BT communication scheme according to a second BT scheme, for example based on a determination that the power state indication 165 indicates a second power state, e.g., as described below.

In some demonstrative aspects, the second power state may support a second power consumption of the BT device 102, e.g., as described below.

In some demonstrative aspects, the first power consumption may be different from the second power consumption, e.g., as described below.

In some demonstrative aspects, the second BT scheme may be configured to support a second BT performance according to the BT performance parameter, e.g., as described below.

In some demonstrative aspects, for example, the first BT performance may be different from the second BT performance, e.g., as described below.

In some demonstrative aspects, the second power consumption supported by the second identified power state, e.g., as indicated by the power state indication 165, may be greater than the first power consumption supported by the first identified power state, e.g., as indicated by the power state indication 165, as described below.

In some demonstrative aspects, BT controller 169 may configure the BT communication scheme such that the second BT performance may be better than the first BT performance, for example, when the second power consumption supported by the second identified power state is determined to be greater than the first power consumption supported by the first identified power state, e.g., as described below.

In some demonstrative aspects, the BT performance parameter may include a BT communication latency over a BT wireless communication link, for example, between BT device 102 and BT device 140, e.g., as described below.

In some demonstrative aspects, the first BT scheme may be configured to support a first BT communication latency over a BT wireless communication link, for example, between BT device 102 and BT device 140, e.g., as described below.

In some demonstrative aspects, the second BT scheme may be configured to support a second BT communication latency over the BT wireless communication link, for example, between BT device 102 and BT device 140, e.g., as described below.

In some demonstrative aspects, the second latency may be, for example, lower than the first latency, e.g., as described below.

In some demonstrative aspects, the BT performance parameter may include a BT scanning parameter for a BT scan, for example, to be performed by BT radio 114, e.g., as described below.

In some demonstrative aspects, the first BT scheme may be configured to support a first BT scan interval for a BT scan, for example, to be performed by BT radio 114, e.g., as described below.

In some demonstrative aspects, the second BT scheme may be configured to support a second BT scan interval for the BT scan, for example, to be performed by BT radio 114, e.g., as described below.

In some demonstrative aspects, the second scan interval may be longer than the first scan interval, e.g., as described below.

In other aspects, the BT performance parameter may include any other additional or alternative performance parameter.

In some demonstrative aspects, BT controller 169 may configure the BT communication scheme according to the first BT scheme, for example, by configuring the BT communication scheme to include a first BT Synchronous Connection-Oriented (SCO) link configuration having a first interval between reserved timeslots, e.g., as described below.

In some demonstrative aspects, BT controller 169 may configure the BT communication scheme according to the second BT scheme, for example, by configuring the BT communication scheme to include a second BT SCO link configuration having a second interval between reserved timeslots, e.g., as described below.

In some demonstrative aspects, the second interval between reserved timeslots, e.g., according to the second BT SCO link configuration, may be different from the first interval between reserved timeslots, e.g., according to the first BT SCO link configuration, as described below.

In some demonstrative aspects, BT controller 169 may configure the BT communication scheme according to one or more additional or alternative parameters, inputs, and/or criteria, for example, in addition to or instead of the power state indication 165, e.g., as described below.

In some demonstrative aspects, input 167 may be configured to receive application information 161 to indicate an application to utilize BT communications of the BT device 102, e.g., as described below.

In some demonstrative aspects, application information 161 may be provided as an HCI message from host processor 166 to controller 124. In one example, the application information 161 and the power state indication 165 may be provided as part of a same or common message, e.g., in a same HCI message or any other message. In another example, the application information 161 and the power state indication 165 may be provided as part of separate messages, e.g., in separate HCI messages or any other messages.

In some demonstrative aspects, BT controller 169 may configure the BT communication scheme, for example, based on the application information 161, e.g., as described below.

In some demonstrative aspects, BT controller 169 may configure the BT communication scheme to support a latency level, which may be based, for example, on a latency requirement of the application to utilize BT communications of the BT device 102, e.g., as described below.

In some demonstrative aspects, BT controller 169 may configure the BT communication scheme to support a latency of no more than 10 millisecond (ms), for example, based on a determination that the application information 161 indicates that a low-latency application is to utilize the BT communications, as described below.

In some demonstrative aspects, BT controller 169 may configure the BT communication scheme to support a latency of no more than 5 ms, for example, based on a determination that the application information 161 indicates that a low-latency application is to utilize the BT communications, as described below.

In some demonstrative aspects, BT controller 169 may configure the BT communication scheme to support a latency of no more than 1 ms, e.g., no more than 0.8 ms, lesson more than 0.7 ms, or any other latency.

In some demonstrative aspects, BT controller 169 may configure the BT communication scheme to support a latency of no more than 1 ms, for example, based on a determination that the application information 161 indicates that a low-latency gaming application is to utilize the BT communications to communicate between the BT device 102 and a peripheral BT device, e.g., device 140, as described below.

In some demonstrative aspects, BT controller 169 may be configured to identify a channel condition of a BT channel for performing the one or more BT activities, e.g., as described below.

For example, BT controller 169 may be configured to identify a channel condition of a BT channel for performing a BT a scan, and/or a channel condition of a channel for performing one or more BT communications with one or more other devices, e.g., with device 140.

In some demonstrative aspects, BT controller 169 may configure the BT communication scheme, for example, based on the channel condition, e.g., as described below.

In some demonstrative aspects, the channel condition may include a congestion level of the BT channel.

In one example, BT controller 169 may be configured to determine and/or monitor the congestion level of the BT channel, for example, based on a count of detected communications, e.g., BT communications by other BT devices, over the BT channel.

In another example, BT controller 169 may be configured to determine and/or monitor the congestion level of the BT channel, for example, based on a count of failed BT transmissions from BT device 102.

In some demonstrative aspects, BT controller 169 may configure a duration of a BT scan interval for a BT scan over the BT channel, for example, based on the congestion level of the BT channel, e.g., as described below.

In some demonstrative aspects, BT controller 169 may dynamically configure the duration of the BT scan interval over the BT channel, for example, relative to the congestion level of the BT channel. For example, BT controller 169 may be configured to increase the duration of the BT scan interval, for example, based on a determination that the congestion level of the BT channel has increased; and/or to decrease the duration of the BT scan interval, for example, based on a determination that the congestion level of the BT channel has decreased.

In some demonstrative aspects, BT controller 169 may configure the BT communication scheme to support communication with a peripheral BT device, e.g., device 140, for a low-latency application, for example, a low-latency gaming application, e.g., as described below.

For example, some peripheral devices, e.g., gaming devices, such as, a gaming mouse or any other gaming controller, may require relatively low latencies. For example, some gaming mice may not tolerate latencies of 70 ms. For example, many gaming mice may support latencies of about 1-2 ms. For example, some gaming mice may be configured to support latencies of even less than 1 ms.

However, an actual latency of a wireless gaming mouse may increase, e.g., towards 70~100 ms, for example, during periods of no mouse movement, e.g., since a USB transport may drop to a low power state, e.g., a "selective suspend" state, when there is no activity on the USB bus. In one example, the USB bus may be required to exit the low power state, for example, based on detected user activity of the mouse, thereby incurring a latency of 70~100 ms. This latency may cause a poor user experience, for example, when, after a period of the mouse link being idle, the user suddenly moves the gaming mouse. This latency may result in degraded user experience, for example, in a use case of a sniper mode in first person shooter games. For example, wired USB mice and/or keyboards may not incur the selective suspend delay and therefore may be able to always meet latencies of less than 1 ms.

In another example, some peripheral devices, e.g., non-gaming devices, such as, a mouse or keyboard used for productivity applications, e.g., working on emails, spreadsheets, word processor documents, and the like, may be allowed to operate with an over the air latency typically between 7.5 ms and 11.25 ms, e.g., according to a Bluetooth protocol. However, in some cases and/or implementations over-the-air latency of 70~100 ms may be unacceptable even for productivity use cases. Productivity mice and keyboard typically are compliant with the Bluetooth standard and can indeed support latencies around 10 ms. However, the user experience can suffer, for example, when the latencies jump to 70~100 ms, e.g., due to the USB selective suspend state exit latency.

In some demonstrative aspects, BT controller 169 may be configured to selectively disable low power state, e.g., the USB selective suspend power state, for example, based on a determination that power state indication 165 indicates that device 102 is wall-powered, and/or that the charge level of the battery of BT device 102 is above a predefined threshold.

In some demonstrative aspects, BT controller 169 may be configured to identify, e.g., based on application information 161, that a latency sensitive application is to be used by a user of device 102, e.g., a latency sensitive game, such as a First-Person Shooter (FPS) game or any other application, is to be used by the user of device 102.

In some demonstrative aspects, BT controller 169 may configure a BT communication link between BT device 102 and BT device 140, for example, based on the determination that the latency sensitive application, e.g., the FPS game, is to be used by the user of device 102. For example, BT controller 169 may configure the BT communication link between BT device 102 and BT device 140 according to a BT communication scheme, e.g., a "standards-plus" connection scheme, which may be configured to support a reduced latency, e.g., a latency of no more than 1 ms. For example, BT controller 169 may configure the BT communication link between BT device 102 and BT device 140 according to a BT communication scheme, which may utilize "standards-plus" connection intervals of as low as 1 ms. Accordingly, this BT communication scheme may provide a technical solution to allow the user of device 102 to use a gaming mouse with very low wireless communication latency, for example, while obviating a need to use an external USB dongle with the gaming mouse.

In some demonstrative aspects, BT controller 169 may configure the BT communication scheme for BT radio 114, for example, based on the power state indication 165 and information regarding user activity of the user of device 102, e.g., as described below.

In some demonstrative aspects, BT controller 169 may configure the BT communication scheme for BT radio 114, for example, to support a reduced performance level and/or to consume less power, for example, based on a determination, that device 102 is operating at a battery-powered state and that no user activity is detected.

For example, BT controller 169 may determine that device 102 is operating at a battery-powered state, e.g., based on the power state indication 165.

In one example, BT controller 169 may determine that there is no user activity or that there is only a reduced level of user activity, for example, based on a determination that no activity is detected by one or more Human Interface Devices (HIDs), e.g., a mouse, a keyboard, a gaming controller, or the like. For example, BT controller 169 may determine that there is no user activity or that there is only a reduced level of user activity, for example, based on a determination that no recent HID reports have been received.

In another example, BT controller 169 may determine that there is no user activity or that there is only a reduced level of user activity, for example, based on observation of the user, e.g., via a camera of device 102, or any other input device.

In some demonstrative aspects, BT controller 169 may configure a BT communication link between BT device 102 and BT device 140, for example, based on the determination that the latency sensitive application, e.g., the FPS game, is to be used by the user of device 102, for example, while device 102 is currently wall-powered. For example, BT controller 169 may configure the BT communication link between BT device 102 and BT device 140 according to a low-latency mode, e.g., a low-latency BLE connection interval, for example, based on a determination that device 102 is currently wall-powered.

In some demonstrative aspects, BT controller 169 may dynamically reconfigure the BT communication link between BT device 102 and BT device 140, for example, based the power state indication 165 and/or the application information 161.

In some demonstrative aspects, BT controller 169 may dynamically self-configure the BT communication link between BT device 102 and BT device 140, for example, for performance vs. power savings.

For example, BT controller 169 may configure the BT communication link between BT device 102 and BT device 140, according to a low-power mode, which may be very power consumption sensitive, for example, based on a determination that power state indication 165 indicates that device 102 is battery-powered and/or that the charge level of the battery of BT device 102 is below a predefined threshold.

For example, BT controller 169 may configure the BT communication link between BT device 102 and BT device 140, according to a high-performance mode, e.g., a low-latency mode, for example, based on a determination that power state indication 165 indicates that device 102 is wall-powered, and a determination that a low-latency application, e.g., a low-latency gaming application, is to utilize the BT communication link.

In some demonstrative aspects, BT controller 169 may configure the BT communication scheme for BT radio 114, for example, by configuring a BT scan to be performed by BT radio 114, e.g., as described below.

In some demonstrative aspects, BT controller 169 may configure a scan duty cycle of the BT scan, for example, based on the power state indication 165, e.g., as described below.

In some demonstrative aspects, BT controller 169 may dynamically increase or decrease a scan duty cycle of the BT scan, for example, based on the power state indication 165, e.g., as described below.

For example, BT controller 169 may set a first duty cycle ("high scan duty cycle") for the BT scan, for example, based on a determination that power state indication 165 indicates that device 102 is wall-powered, and/or that the charge level of the battery of BT device 102 is above a predefined threshold.

For example, BT controller 169 may set a second duty cycle ("low scan duty cycle") for the BT scan, e.g., lower than the high duty cycle, for example, based on a determination that power state indication 165 indicates that device 102 is battery-powered and/or that the charge level of the battery of BT device 102 is below a predefined threshold.

In one example, BT controller 169 may set a higher duty cycle LE scan, for example, based on a determination that power state indication 165 indicates that device 102 is wall-powered and/or that the charge level of the battery of BT device 102 is below a predefined threshold.

In one example, BT controller 169 may set a relatively low duty cycle scan, e.g., a duty cycle for scanning 10% of the time, for example, based on a determination that power state indication 165 indicates that device 102 is battery-powered and/or that the charge level of the battery of BT device 102 is below a predefined threshold.

In one example, BT controller 169 may set a relatively high duty cycle scan, e.g., a duty cycle for scanning at least 20% of the time or even more than 50% of the time, for example, based on a determination that power state indication 165 indicates that device 102 is wall-powered, and/or that the charge level of the battery of BT device 102 is above a predefined threshold.

For example, the ability to increase the scan duty cycle of the BT scan may provide technical benefits, for example, improved responsiveness and/or better user experience.

In some demonstrative aspects, BT controller 169 may selectively operate BT radio 114 at a low-power, low performance, receive mode, for example, based on the power state indication 165, e.g., as described below.

For example, BT controller 169 may control and/or operate BT radio 114 at the low-power, low performance, receive mode, for example, based on a determination that power state indication 165 indicates that device 102 is battery-powered and/or that the charge level of the battery of BT device 102 is below a predefined threshold.

For example, BT controller 169 may select not to operate BT radio 114 at the low-power, low performance, receive mode, for example, based on a determination that power state indication 165 indicates that device 102 is wall-powered, and/or that the charge level of the battery of BT device 102 is above a predefined threshold.

In some demonstrative aspects, BT controller 169 may dynamically switch between low power and high performance modes of operation of BT radio 114, for example, based on what BT profile is being used, and/or based on current link quality conditions.

In some demonstrative aspects, BT controller 169 may selectively enable BT communications for a High Accuracy Distance Measurement (HADM) functionality, for example, based on the power state indication 165, e.g., as described below.

For example, BT controller 169 may disable BT communication of BT radio 114 for the HADM functionality, for example, based on a determination that power state indication 165 indicates that device 102 is battery-powered and/or that the charge level of the battery of BT device 102 is below a predefined threshold.

For example, BT controller 169 may enable BT communication of BT radio 114 for the HADM functionality, for example, based on a determination that power state indication 165 indicates that device 102 is wall-powered, and/or that the charge level of the battery of BT device 102 is above a predefined threshold.

In some demonstrative aspects, BT controller 169 may dynamically configure Received Signal Strength Indicator (RSSI) measurements on BT communications by BT radio 114, for example, based on the power state indication 165, e.g., as described below.

For example, BT controller 169 may set a first duty cycle ("high RSSI duty cycle") for RSSI measurements, for example, based on a determination that power state indication 165 indicates that device 102 is wall-powered, and/or that the charge level of the battery of BT device 102 is above a predefined threshold.

For example, BT controller 169 may set a second duty cycle ("low RSSI duty cycle") for RSSI measurements, e.g., lower than the high duty cycle, for example, based on a determination that power state indication 165 indicates that device 102 is battery-powered and/or that the charge level of the battery of BT device 102 is below a predefined threshold.

For example, increasing the RSSI duty cycle may allow performing more RSSI measurements, for example, to be able to better configure a scan duty cycle, and/or to determine more accurately levels of proximate interferers, which support Adaptive Frequency Hopping (AFH) channel classification.

In some demonstrative aspects, device 102 may utilize one or more algorithms, e.g., Transmit (Tx) Power Control (TPC) algorithms and/or Channel Quality Driven Data Rate (CQDDR) algorithms, which may be configured to request peer devices to transmit at higher power and/or lower modulation rates, for example, when the environment is congested. Accordingly, configuring device to operate at a "power hungry" mode, e.g., to frequently, or even constantly, measure the interference environment may be advantageous for performance of these algorithms.

In some demonstrative aspects, BT controller 169 may control and/or trigger AFH channel classification scans to run more frequently, for example, based on a determination that power state indication 165 indicates that device 102 is wall-powered, and/or that the charge level of the battery of BT device 102 is above a predefined threshold. For example, performing the AFH channel classification scans more frequently may improve reaction times to an environment with rapidly changing interference, e.g., due to the presence of many proximate WiFi networks and/or other interferers in the same frequency band.

In some demonstrative aspects, BT controller 169 may be configured to dynamically select operational modes of BT radio 114, for example, based on estimating the number and/or intervals of advertisers in the vicinity of BT device, and/or based on estimating proximate interference traffic intensity and/or levels.

In some demonstrative aspects, BT controller 169 may be configured to autonomously control BT activities of BT device 102, for example, by dynamically configuring high duty cycle scanning and/or other BT operations e.g., as described above. For example, at least some of these operations may be autonomously triggered and controlled by BT controller 169, for example, independent of operations configured by host processor 166.

In some demonstrative aspects, BT controller 169 may be configured to perform a handshaking procedure and/or a negotiation procedure with host processor 166, for example, in order to coordinate and/or inform host processor 166 regarding these BT activities.

Reference is made to FIG. 2, which schematically illustrates a method of controlling BT activities of a BT device, in accordance with some demonstrative aspects. For example, one or more of the operations of the method of FIG. 2 may be performed by one or more elements of a system, e.g., system 100 (FIG. 1), for example, may be performed by a BT device, e.g., BT device 102 (FIG. 1), and/or a controller, e.g., controller 124 (FIG. 1) and/or BT controller 169 (FIG. 1).

As indicated at block 202, the method may include 202 receiving a power state indication from a host processor of a BT device, the power state indication to indicate a power state corresponding to a power source being utilized by the BT device. For example, BT controller 169 (FIG. 1) may receive the power state indication 165 (FIG. 1) from host processor 166 (FIG. 1), e.g., as described above.

As indicated at block 204, the method may include controlling one or more BT activities of the BT device according to a BT communication scheme configured based on the power state indication. For example, BT controller 169 (FIG. 1) may be configured to control one or more Bt activities of BT device 102, for example, based at least on the power state indication 165 (FIG. 1), e.g., as described above.

As indicated at block 206, controlling the one or more BT activities of the BT device according to the BT communication scheme may include determining a selected BT scheme from a plurality of BT schemes, for example, based on the power state indication. For example, BT controller 169 (FIG. 1) may be configured to determine the selected BT scheme from the plurality of BT schemes, for example, based on power state indication 165 (FIG. 1), e.g., as described above.

As indicated at block 208, controlling the one or more BT activities of the BT device according to the BT communication scheme may include configuring the BT communication scheme based on the selected BT scheme. For example, BT controller 169 (FIG. 1) may be configured to configure the BT communication scheme based on the selected BT scheme, e.g., as described above.

Figure 3:
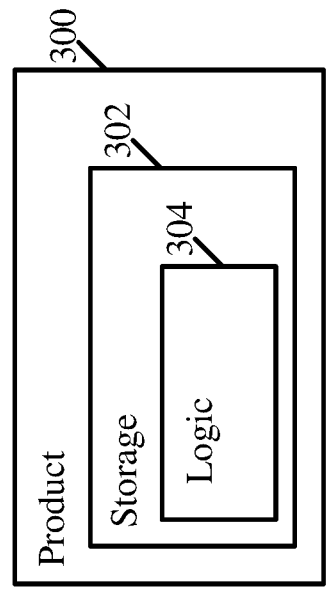
FIG. 3 is a schematic illustration of a product of manufacture, in accordance with some demonstrative aspects.

Reference is made to FIG. 3, which schematically illustrates a product of manufacture 300, in accordance with some demonstrative aspects. Product 300 may include one or more tangible computer-readable ("machine-readable") non-transitory storage media 302, which may include computer-executable instructions, e.g., implemented by logic 304, operable to, when executed by at least one computer processor, enable the at least one computer processor to implement one or more operations at device 102 (FIG. 1), BT radio 114 (FIG. 1), controller 124 (FIG. 1), BT controller 169 (FIG. 1), receiver 116 (FIG. 1), transmitter 118 (FIG. 1), and/or message processor 128 (FIG. 1), to cause device 102 (FIG. 1), BT radio 114 (FIG. 1), controller 124 (FIG. 1), BT controller 169 (FIG. 1), receiver 116 (FIG. 1), transmitter 118 (FIG. 1), and/or message processor 128 (FIG. 1), to perform, trigger and/or implement one or more operations and/or functionalities, and/or to perform, trigger and/or implement one or more operations and/or functionalities described with reference to the FIGS. 1 and/or 2, and/or one or more operations described herein. The phrases "non-transitory machine-readable medium" and "computer-readable non-transitory storage media" may be directed to include all computer-readable media, with the sole exception being a transitory propagating signal.

In some demonstrative aspects, product 300 and/or machine-readable storage media 302 may include one or more types of computer-readable storage media capable of storing data, including volatile memory, non-volatile memory, removable or non-removable memory, erasable or non-erasable memory, writeable or rewriteable memory, and the like. For example, machine-readable storage media 302 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EE-PROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 304 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 304 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further aspects.

Example 1 includes an apparatus of a Bluetooth (BT) device, the apparatus comprising an input to receive a power state indication from a host processor of the BT device, the power state indication to indicate a power state corresponding to a power source being utilized by the BT device; and a BT controller including logic and circuitry configured to control one or more BT activities of the BT device according to a BT communication scheme, the BT controller to configure the BT communication scheme based on the power state indication.

Example 2 includes the subject matter of Example 1, and optionally, wherein the BT controller is to configure the BT communication scheme according to a first BT scheme based on a first power state indicated by the power state indication, and to configure the BT communication scheme according to a second BT scheme based on a second power state indicated by the power state indication, wherein the first BT scheme is configured to support a first BT performance according to a BT performance parameter, and the second BT scheme is configured to support a second BT performance according to the BT performance parameter, and wherein the first power state supports a first power consumption of the BT device, and the second power state supports a second power consumption of the BT device, the first BT performance is different from the second BT performance, the first power consumption different from the second power consumption.

Example 3 includes the subject matter of Example 2, and optionally, wherein the second BT performance is better than the first BT performance, and wherein the second power consumption supported by the second identified power state is greater than the first power consumption supported by the first identified power state.

Example 4 includes the subject matter of Example 3, and optionally, wherein the first BT scheme is configured to support a first BT communication latency over a BT wireless communication link, and the second BT scheme is configured to support a second BT communication latency over the BT wireless communication link, the second latency is lower than the first latency.

Example 5 includes the subject matter of Example 3 or 4, and optionally, wherein the first BT scheme is configured to support a first BT scan interval for a BT scan, and the second BT scheme is configured to support a second BT scan interval for the BT scan, the second scan interval is longer than the first scan interval.

Example 6 includes the subject matter of any one of Examples 2-5, and optionally, wherein the BT performance parameter comprises a BT communication latency over a BT wireless communication link.

Example 7 includes the subject matter of any one of Examples 2-6, and optionally, wherein the first BT scheme comprises a first BT Synchronous Connection-Oriented (SCO) link configuration having a first interval between reserved timeslots, and wherein the second BT scheme comprises a second BT SCO link configuration having a second interval between reserved timeslots, the second interval between reserved timeslots is different from the first interval between reserved timeslots.

Example 8 includes the subject matter of any one of Examples 2-7, and optionally, wherein the BT performance parameter comprises a BT scanning parameter.

Example 9 includes the subject matter of any one of Examples 1-8, and optionally, wherein the BT controller is configured to determine a selected BT scheme from a plurality of BT schemes based on the power state indication, and to configure the BT communication scheme based on the selected BT scheme.

Example 10 includes the subject matter of any one of Examples 1-9, and optionally, wherein the input is to receive application information to indicate an application to utilize BT communications of the BT device, wherein the BT controller is to configure the BT communication scheme based on the application information.

Example 11 includes the subject matter of Example 10, and optionally, wherein the BT controller is configured to configure the BT communication scheme to support a latency level based on a latency requirement of the application to utilize BT communications of the BT device.

Example 12 includes the subject matter of Example 11, and optionally, wherein the BT controller is to configure the BT communication scheme to support a latency of no more than 1 millisecond, based on the application information indicating that a low-latency gaming application is to utilize the BT communications to communicate between the BT device and a peripheral BT device.

Example 13 includes the subject matter of any one of Examples 1-12, and optionally, wherein the BT controller is configured to identify a channel condition of a BT channel for performing the one or more BT activities, and to configure the BT communication scheme based on the channel condition.

Example 14 includes the subject matter of Example 13, and optionally, wherein the channel condition comprises a congestion level of the BT channel.

Example 15 includes the subject matter of Example 14, and optionally, wherein the BT controller is to configure a duration of a BT scan interval for a BT scan over the BT channel based on the congestion level of the BT channel.

Example 16 includes the subject matter of any one of Examples 1-15, and optionally, wherein the power state indication is to identify whether the power source being utilized by the BT device comprises a battery of the BT device or a wall outlet.

Example 17 includes the subject matter of any one of Examples 1-16, and optionally, wherein the power state indication comprises an indication of a charge level of a battery of the BT device.

Example 18 includes the subject matter of any one of Examples 1-17, and optionally, comprising a BT radio, the BT controller configured to control the BT radio to communicate one or more BT transmissions according to the BT communication scheme.

Example 19 includes the subject matter of Example 18, and optionally, comprising one or more antennas connected to the radio, the host processor, and a memory to store information processed by the host processor.

Example 20 comprises an apparatus comprising means for executing any of the described operations of Examples 1-19.

Example 21 comprises a product comprising one or more tangible computer-readable non-transitory storage media comprising computer-executable instructions operable to, when executed by at least one processor, enable the at least one processor to cause a computing device to perform any of the described operations of Examples 1-19.

Example 22 comprises an apparatus comprising: a memory interface; and processing circuitry configured to: perform any of the described operations of Examples 1-19.

Example 23 comprises a method comprising any of the described operations of Examples 1-19.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus of a Bluetooth (BT) device, the apparatus comprising:

an input to receive a power state indication from a host processor of the BT device, the power state indication to indicate a power state corresponding to a power source being utilized by the BT device; and a BT controller including logic and circuitry configured to control one or more BT activities performed by the BT device according to a BT communication scheme, the BT controller to configure the BT communication scheme based on the power state indication, wherein the BT controller is to configure the BT communication scheme by configuring a BT link parameter based on the power state indication, wherein the BT controller is to configure a BT communication latency based on the power state indication, the BT controller to configure an interval between reserved timeslots of a BT link based on the power state indication.

2. The apparatus of claim 1, wherein the BT controller is to configure the BT communication scheme to control one or more first BT activities performed by the BT device according to a first BT scheme by configuring a first BT link parameter based on a first power state indicated by the power state indication, and to configure the BT communication scheme according to a second BT scheme to control one or more second BT activities performed by the BT device by configuring a second BT link parameter based on a second power state indicated by the power state indication, wherein the first BT scheme is configured to support a first BT performance according to a BT performance parameter, and the second BT scheme is configured to support a second BT performance according to the BT performance parameter, and wherein the first power state supports a first power consumption of the BT device, and the second power state supports a second power consumption of the BT device, the first BT performance is different from the second BT performance, the first power consumption different from the second power consumption.

3. The apparatus of claim 2, wherein the second BT performance is better than the first BT performance, and wherein the second power consumption supported by the second power state is greater than the first power consumption supported by the first power state.

4. The apparatus of claim 3, wherein the first BT scheme is configured to support a first BT communication latency over the BT link, and the second BT scheme is configured to support a second BT communication latency over the BT link, the second latency is lower than the first latency.

5. The apparatus of claim 3, wherein the first BT scheme is configured to support a first BT scan interval for a BT scan, and the second BT scheme is configured to support a second BT scan interval for the BT scan, the second scan interval is longer than the first scan interval.

6. The apparatus of claim 2, wherein the BT performance parameter comprises the BT communication latency over the BT link.

7. The apparatus of claim 2, wherein the first BT scheme comprises a first BT Synchronous Connection-Oriented (SCO) link configuration having a first interval between reserved timeslots of the first BT SCO link configuration, and wherein the second BT scheme comprises a second BT SCO link configuration having a second interval between reserved timeslots of the second BT SCO link configuration, the second interval between reserved timeslots is different from the first interval between reserved timeslots.

8. The apparatus of claim 1, wherein the BT controller is configured to determine a selected BT scheme from a plurality of BT schemes based on the power state indication, and to configure the BT communication scheme based on the selected BT scheme.

9. The apparatus of claim 1, wherein the input is to receive application information to indicate an application to utilize BT communications of the BT device, wherein the BT controller is to configure the BT communication scheme based on the application information.

10. The apparatus of claim 9, wherein the BT controller is configured to configure the BT communication scheme to support a latency level based on a latency requirement of the application to utilize the BT communications of the BT device.

11. The apparatus of claim 10, wherein the BT controller is to configure the BT communication scheme to support a latency of no more than 1 millisecond, based on the application information indicating that a low-latency gaming application is to utilize the BT communications to communicate between the BT device and a peripheral BT device.

12. The apparatus of claim 1, wherein the BT controller is configured to identify a channel condition of a BT channel for performing the one or more BT activities, and to configure the BT communication scheme based on the channel condition.

13. The apparatus of claim 12, wherein the channel condition comprises a congestion level of the BT channel.

14. The apparatus of claim 13, wherein the BT controller is to configure a duration of a BT scan interval for a BT scan over the BT channel based on the congestion level of the BT channel.

15. The apparatus of claim 1, wherein the power state indication is to identify whether the power source being utilized by the BT device comprises a battery of the BT device or a wall outlet.

16. The apparatus of claim 1, wherein the power state indication comprises an indication of a charge level of a battery of the BT device.

17. The apparatus of claim 1 comprising a BT radio, one or more antennas connected to the BT radio, the host processor, and a memory to store information processed by the host processor, wherein the BT controller is configured to control the BT radio to communicate one or more BT transmissions according to the BT communication scheme.

18. The apparatus of claim 1, wherein the one or more BT activities performed by the BT device according to the BT communication scheme comprises a BT transmission performed according to the BT link parameter.

19. A product comprising one or more tangible computer-readable non-transitory storage media comprising computer-executable instructions operable to, when executed by at least one processor, enable the at least one processor to cause a Bluetooth (BT) controller of a BT device to:

process a power state indication from a host processor of the BT device, the power state indication to indicate a power state corresponding to a power source being utilized by the BT device;

configure a BT communication scheme based on the power state indication by configuring a BT link parameter based on the power state indication, wherein the BT communication scheme is to configure one or more BT activities performed by the BT device, wherein the instructions, when executed, cause the BT controller to configure a BT communication latency based on the power state indication, wherein the instructions, when executed, cause the BT controller to configure an interval between reserved timeslots of a BT link based on the power state indication; and control the one or more BT activities performed by the BT device according to the BT communication scheme.

20. The product of claim 19, wherein the instructions, when executed, cause the BT controller to configure the BT communication scheme according to a first BT scheme based on a first power state indicated by the power state indication, and to configure the BT communication scheme according to a second BT scheme based on a second power state indicated by the power state indication, wherein the first BT scheme is configured to support a first BT performance according to a BT performance parameter, and the second BT scheme is configured to support a second BT performance according to the BT performance parameter, and wherein the first power state supports a first power consumption of the BT device, and the second power state supports a second power consumption of the BT device, the first BT performance is different from the second BT performance, the first power consumption different from the second power consumption.

21. The product of claim 19, wherein the instructions, when executed, cause the BT controller to determine a selected BT scheme from a plurality of BT schemes based on the power state indication, and to configure the BT communication scheme based on the selected BT scheme.

22. The product of claim 19, wherein the instructions, when executed, cause the BT controller to process application information to indicate an application to utilize BT communications of the BT device, and to configure the BT communication scheme based on the application information, wherein the instructions, when executed, cause the BT controller to configure the BT communication latency based on the power state indication and the application information.

23. An apparatus of a Bluetooth (BT) device, the apparatus comprising:

means for receiving a power state indication from a host processor of the BT device, the power state indication to indicate a power state corresponding to a power source being utilized by the BT device; and means for configuring a BT communication scheme based on the power state indication by configuring a BT link parameter based on the power state indication, and controlling one or more BT activities performed by the BT device according to the BT communication scheme, wherein the means for configuring the BT communication scheme comprises means for configuring a BT communication latency based on the power state indication, the means for configuring the BT communication scheme comprises means for configuring an interval between reserved timeslots of a BT link based on the power state indication.

24. The apparatus of claim 23 comprising means for configuring the BT communication scheme according to a first BT scheme by configuring a first setting of the BT link parameter based on a first power state indicated by the power state indication, and configuring the BT communication scheme according to a second BT scheme by configuring a second setting, different from the first setting, of the BT link parameter based on a second power state indicated by the power state indication.

\* \* \* \* \*